Figure 1:
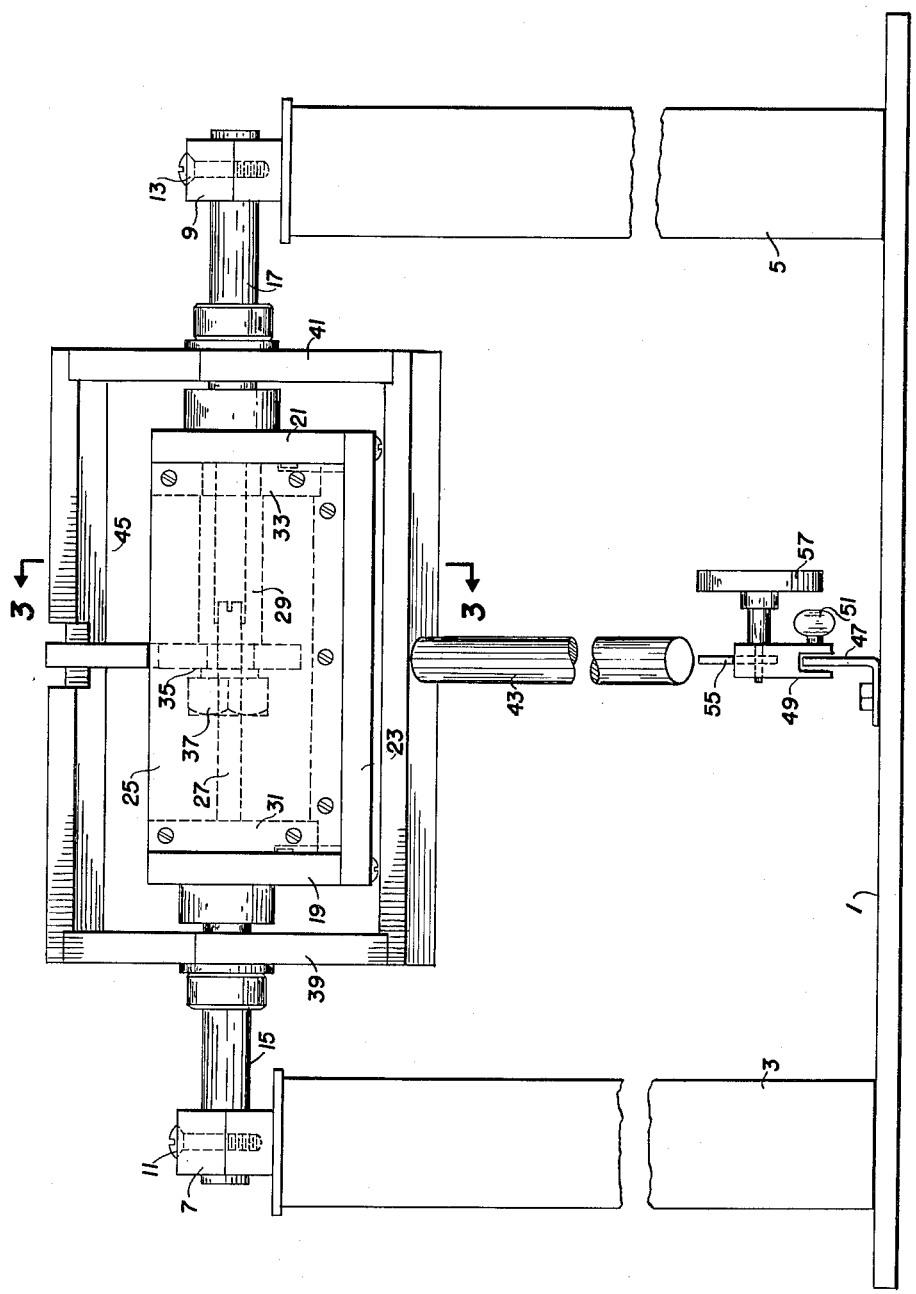

Nov. 21, 1961  R. G. MOYER  3,009,351
LUBRICANT TESTER
Filed July 9, 1957  2 Sheets-Sheet 1

INVENTOR.
ROBERT G. MOYER
BY
ATTORNEY

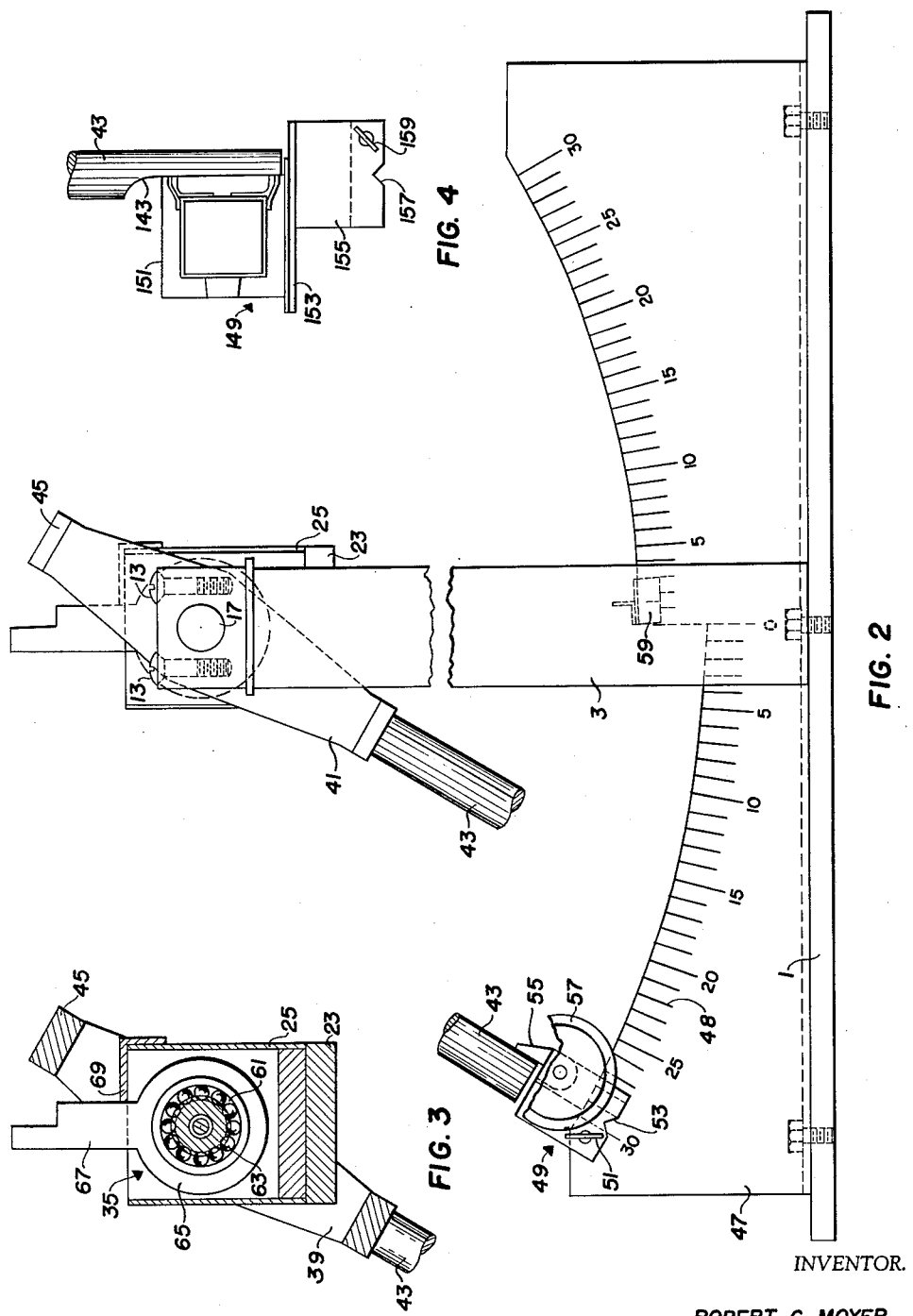

United States Patent Office 3,009,351
Patented Nov. 21, 1961

3,009,351
LUBRICANT TESTER
Robert G. Moyer, Crystal Lake, Ill., assignor to The Pure Oil Company, Chicago, Ill., a corporation of Ohio
Filed July 9, 1957, Ser. No. 670,673
7 Claims. (Cl. 73—10)

This invention relates to a new and useful apparatus for testing the torque-resistance characteristic of lubricants.

In evaluating the performance characteristics of lubricants many methods and apparatus have been devised for determining the extent to which lubricants affect the friction between moving parts. However, in many cases it is desirable to determine the starting or break-away torque characteristics, i.e., the drag resistance to rotation, etc., of the lubricants in bearings and other similar environments when the mechanisms are put into motion. Such a determination is necessary because of the fact that different lubricants may provide substantially identical reductions in moving friction and yet differ markedly in resistance to the starting of rotation. In devising an apparatus which will measure the starting or break-away characteristics of lubricants it is also desirable that some means be provided to determine these characteristics under a variety of conditions, particularly at various operating temperatures.

It is therefore an object of this invention to provide a new and improved apparatus for measuring the starting torque characteristics of lubricants in rotary bearings.

Another object of this invention is to provide an apparatus for determining the starting torque resistance of the lubricant, which is simple to construct and easy to operate.

A feature of this invention is the provision of an improved apparatus for determining the starting torque resistance of a lubricant which includes a means to apply a predetermined quantum for energy to initiate rotation of a lubricated bearing member and means to measure the amount of energy absorbed in starting rotary movement of said bearing member.

Another feature of this invention is the provision of an apparatus for measuring the starting torque resistance of a lubricant which includes a pendulum arranged to provide a rotary impact force to a rotary bearing member and means to measure the movement of the pendulum past the point of impact to determine the amount of energy of the pendulum absorbed in starting the rotary movement of the bearing member.

Other objects and features of this invention will become apparent from time to time throughout the specification and claims as hereinafter related.

In the accompanying drawings, to be taken as a part of this specification, there are clearly and fully illustrated two preferred embodiments of this invention, in which drawings, FIG. 1 is a view in front elevation of the improved test apparatus which forms this invention, FIG. 2 is a view in right elevation of FIG. 1 showing in detail the apparatus for releasing the pendulum and for measuring the extent of movement thereof to determine the starting torque characteristics of a lubricant in a rotary bearing, FIG. 3 is a detail sectional view taken on the line 3—3 of FIG. 1, and shows the test bearing and lubricant cup therefor, and their relationship to the operating pendulum of the apparatus, and FIG. 4 is a detail view of another embodiment of the invention which utilizes an electromagnetic release for the operating pendulum of the apparatus.

This inventoin consists of an improved apparatus for testing the break-away torque-resistance characteristics of a lubricant. In this apparatus there is provided a rotary bearing member having a laterally projecting arm arranged for actuation by an operating pendulum. The pendulum is released from a predetermined height and engages the arm of the bearing member to rotate the same. The movement of the pendulum past the point of impact with the arm of the bearing member is measured and may be calibrated on an appropriate scale as a direct measurement of the torque-resistance characteristics of the bearing, since the reduction of movement of the pendulum past the point of impact is a measure of the frictional resistance of the bearing member.

The rotation of any bearing originally in a stationary condition must of necessity involve both starting and moving friction. The energy required to overcome starting friction is independent of the angular distance through which the bearing rotates. The energy required to overcome moving friction is proportional to the angular distance through which the bearing is rotated. The actual energy measured by the apparatus of this invention is, of course, the sum of the energies expended to overcome starting and moving friction.

It is apparent that where the total distance through which the bearing is rotated is maintained at a minimum, the ratio of energy expended in overcoming starting friction to energy expended overcoming moving friction will be high. Thus, the error in the measurements introduced by the moving friction of the bearing tested will be kept to a minimum. It is a feature of this invention to postpone movement of the bearing tested until the pendulum has reached the mid-point of its swing. The bearing is then accelerated by the impact of the pendulum and the bearing and pendulum traveled together until the pendulum reaches the end of its swing.

Referring to the drawing by numerals of reference and more particularly to FIG. 1, there is shown a lubricant test apparatus which includes supporting members 3 and 5. At the upper ends of supporting members 3 and 5 there are positioned split-collar members 7 and 9, respectively, which are secured in place by screws 11 and 13 and support shafts or axle members 15 and 17, respectively. Shafts 15 and 17 extend into the walls 19 and 21 of a supporting cradle 23. Within the supporting cradle 23 there is positioned a cup-shaped casing 25 which receives the lubricant to be tested. Within the casing 25 there are positioned two parts, 27 and 29, of a shaft which are supported in the walls 31 and 33 of casing 25 and support bearing member 35 held in position by nut 37.

Rotatably supported on shafts 15 and 17 are side walls 39 and 41 of a supporting yoke for pendulum 43. The supporting walls 39 and 41 of the yoke for pendulum 43 support an impact member 45 arranged to rotate the bearing 45.

Between supporting columns 3 and 5, and supported on the base 1, is a thin arcuate-shaped supporting plate member 47 positioned in the plane of movement of pendulum 43. Supporting member 47 is provided with a plurality of indicia 48 which indicate the degree of movement of pendulum 43 to either side of a vertical (zero) position. On one side of supporting member 47 is positioned mechanical release mechanism 49 for pendulum 43. Mechanical release mechanism 49 is secured on supporting member 47 by thumbscrew 51 and has notched portion 53 for registering position. Release mechanism 49 includes rotary latch member 55 engageable with pendulum 43 to hold the same in an initial starting position and is actuated by rotary disc 57. On the opposite side of arcuate supporting member 47 is positioned cursor member 59 which rides freely on supporting member 47 and is movable by pendulum 43 to register the maximum extent of movement thereof. Weights are added to pendulum 43 if necessary.

Bearing member 35 (see FIG. 3) includes ball-bearing assembly 63, consisting of balls, separator and ball races, on which there is supported rotary member 65 having outwardly extending impact arm 67. Rotary member 65 is counterweighted to balance the weight of arm 67. Impact arm 67 is held in an initial vertical position by stop member 69 on cup-shaped casing 25 and is arranged for actuation by striker member portion 45 of the supporting yoke for pendulum 43. When a liquid lubricant is to be tested, the cup-shaped casing 25 is filled with lubricant until the entire bearing assembly is covered with lubricant. If a grease is to be tested, the bearing spaces 61 are merely packed with the grease.

In the operation of this test apparatus, the bearing 35 is packed with grease or the cup-shaped container 25 is filled with liquid lubricant, depending upon the type of lubricant to be tested. The impact arm 67 is supported in a vertical position against the stop member 69. The supporting yoke or cradle 23 and container 25 are supported in a fixed vertical position on shafts 15 and 17. Pendulum 43 and supporting yoke 39 are freely rotatable on shafts 15 and 17. Pendulum 43 is moved to a predetermined elevated position and held in said position by the mechanical release mechanism 49, as shown in FIG. 2. When disc 57 is rotated, the latch member 55 is released to turn freely out of the way as pendulum 43 is pulled by gravity. As pendulum 43 swings to the right (as viewed in FIG. 2), the impact surface 45 moves toward impact arm 67 and makes contact therewith when the pendulum is in a vertical position. Pendulum 43 continues to move to the right and moves impact arm 67 to rotate bearing member 65. As pendulum 43 moves to the right, cursor member 59 is moved therewith and registers the maximum movement of the pendulum. This movement to the right will be substantially less than the initial elevation from which the pendulum was released due principally to the energy absorbed by the starting torque resistance of the lubricant. The difference between the movement of pendulum 43 to the right of the vertical position and the distance to the left of vertical from which it was released is a direct measure of the starting torque resistance of the lubricant and can be converted to units of starting torque resistance by appropriate calculations. The indicia on the right-hand portion of arcuate supporting member 47 may also be arranged, if desired, to read directly in units of starting torque resistance of a particular lubricant.

If the lubricant is to be tested at temperatures substantially different than room temperature, the lubricant cup 25 is removed from cradle 23 for storage in a controlled temperature chamber. This causes the test lubricant to be brought to the desired test temperature while maintaining the bearings of the supporting yoke at room temperature and free from change in friction due to low temperature.

In a series of tests, a number of greases and oils were evaluated under varying conditions of temperature using this apparatus. The results of these tests are set forth in Table I.

*Table I*

| Lubricant | Temp., °F. | Point of release of pendulum, ° left of vertical | Max. movement of pendulum, ° right of vertical |
|---|---|---|---|
| NLGI #0 grease | 22 | 30 | 24.9-25.0 |
| NLGI #1 grease | 22 | 30 | 24.0-24.9 |
| Sulfurized-phosphorized EP gear oil | -40 | 30 | 0.0 |
| Do | 0 | 30 | 11.0 |
| Do | +30 | 30 | 21.0 |
| Lard oil base EP gear oil | -30 | 30 | 0.0 |
| Do | 0 | 30 | 10.5 |
| Do | +30 | 30 | 20.5 |

From the tests shown in Table I, the differences in starting torque resistance of the lubricants at different temperatures is demonstrated by the amount of force absorbed from the impact of the pendulum as determined by the difference of the initial release point of the pendulum and the maximum movement of the pendulum to the right. In the case of lubricants which completely stop the pendulum, as indicated by 0° of movement to the right, it is necessary to use a heavier pendulum for low-temperature measurements.

In FIG. 4 there is shown another embodiment of this invention which consists of an improved release mechanism 149 for pendulum 43. The apparatus in all other respects is identical to that disclosed in the other figures. In this embodiment of the invention the lower end of pendulum 43 has a cut out portion 143 which functions as an armature for an electromagnet 151, pendulum 43 being of magnetic material. Electromagnet 151 is mounted on support 153 on supporting member 155 having notched indicating portion 157 and thumbscrew 159 for securing the release mechanism at any given point on the arcuate supporting member 47. The operation of this embodiment of the invention is identical to that of the principal embodiment except that the pendulum is released by de-energization of electromagnet 151.

While there have been described two preferred embodiments of this invention, it should be understood that within the scope of the appended claims this invention may be practiced otherwise than as specifically described.

What is claimed is:

1. An apparatus for determining the starting torque resistance of a lubricant, which includes in combination a supporting base with a horizontal axle, a rotatable bearing member, including a radially projecting arm portion, supported on said axle and adapted to receive lubricant to be tested, a rotatable pendulum supported on said axle at a point spaced laterally from said bearing member and having a portion engageable with the radially projecting portion of said bearing member, said bearing member being positioned with said projecting portion located for engagement by said pendulum at substantially the mid point of swing of said pendulum, an arcuate supporting member extending in the plane of rotation of said pendulum, means movably supported on said arcuate supporting member and co-operable with said pendulum for releasing the same for movement from a predetermined initial position, and means operatively engageable by said pendulum for measuring the extent of movement thereof past the point of engagement with said projecting portion.

2. An apparatus according to claim 1 in which the means engageable by said pendulum is movably supported on said arcuate supporting member for movement with said pendulum to register the extent of movement of said pendulum after engagement with said bearing member.

3. An apparatus according to claim 1 including a cup-shaped member surrounding said bearing member for containing a liquid lubricant therefor.

4. An apparatus according to claim 2 including a cup-shaped member surrounding said bearing member for containing a liquid lubricant therefor.

5. An apparatus according to claim 4 on which at least a portion of said pendulum is of magnetic material and said releasing means is an electromagnet.

6. An apparatus according to claim 5 in which said bearing member includes a rotary ball-bearing structure adapted to be packed with a lubricant to be tested.

7. An apparatus for determining the starting torque resistance of a lubricant, which includes in combination, a rotatable bearing member having a radially extending arm, means supporting said bearing member for rotation, means for supporting the lubricant to be tested in lubricating contact with said bearing member, pendulum means movable into and out of engagement with said arm and operable to apply an impact force at the mid point of its swing for rotating said bearing member, and means for measuring the extent of movement of said pendulum means past said impact with said arm to measure the amount of energy absorbed to start rotary movement of said bearing member.

References Cited in the file of this patent

UNITED STATES PATENTS

| | | |
|---|---|---|
| 1,989,627 | Sage | Jan. 29, 1935 |
| 2,388,246 | Berger | Nov. 6, 1945 |